Nov. 21, 1967    E. ZEHENDER ETAL    3,354,247
METHOD OF PRODUCING POROUS SEPARATORS
Filed May 6, 1965
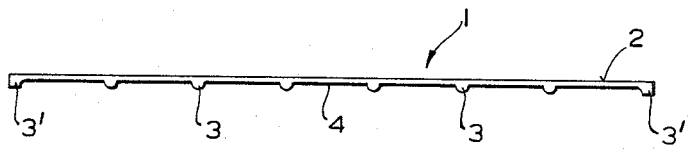
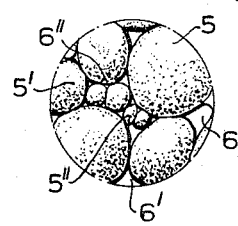
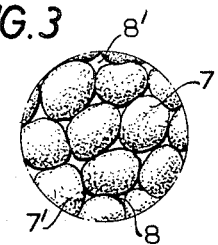
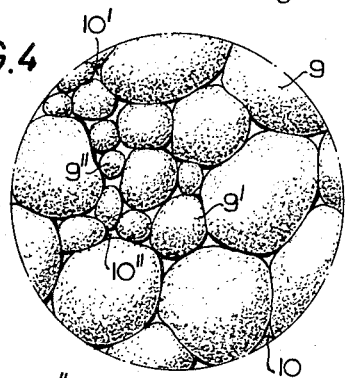
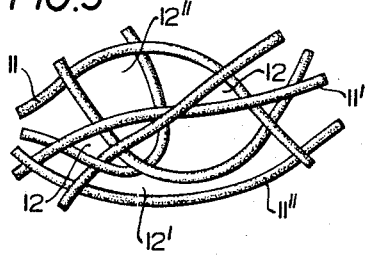
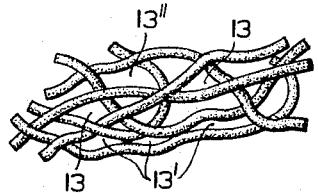
INVENTORS
Ernst Zehender
Siegfried Ziegler
by Michael J. Striker

United States Patent Office 3,354,247
Patented Nov. 21, 1967

3,354,247
METHOD OF PRODUCING POROUS SEPARATORS
Ernst Zehender, Hohenacker, Kreis Waiblingen, and Siegfried Ziegler, Hildesheim, Germany, assignors to Robert Bosch G.m.b.H., Stuttgart, Germany
Filed May 6, 1965, Ser. No. 453,647
Claims priority, application Germany, May 8, 1964, B 76,684
6 Claims. (Cl. 264—119)

ABSTRACT OF THE DISCLOSURE

Insulating bodies such as porous separators for lead storage batteries and the like, having a substantially uniform porosity, preferably with pore diameters below 40 microns, are produced by extruding onto a support a layer of discrete granular particles of insulating material adapted to be sintered, sintering the particles of the thus formed layer slightly so as to form a coherent but still compressible layer, compressing the coherent layer so as to reduce and substantially equalize the dimensions of the interstices or pores therein, and then further sintering the thus compressed layer to transform the same into a rigid, self-supporting body formed with open pores of substantially equal dimensions.

---

The present invention relates to a method of producing porous plates such as separator plates, particularly of the type used in lead storage batteries, and the like, which plates are produced of insulating materials which may be pulverulent materials or fibrous materials. A layer of such fibrous or pulverulent material is formed on a support, preferably by an extrusion process, and the discrete pulverulent or fibrous bodies are then combined into a self-supporting liquid-permeable foil sheet or plate. Pulverulent material used for this purpose preferably will consist of particles having diameter of between 20 and 200 microns and preferably comprising several groups whereby the particles of each group have substantially the same diameter. Fibers which are to form the separator plate in accordance with the process of the present invention preferably will have diameters of between 1 and 10 microns, and it is preferred that all of the fibers used for forming a plate are of substantially the same diameter.

It has been proposed to produce such separators by extruding onto a moving belt either a pulverulent synthetic material or a fibrous mass which may consist of natural fibers such as mechanical wood pulp, or of glass fibers or the like. The material which, regardless of its shape, will be an insulating material, may be also impregnated with an agent adapted to improve the properties of the separator, and a layer may be formed on a smooth support, or on a support formed with grooves which correspond in their arrangement and dimension to the ribs desired in the final separator. The layer is formed in the desired thickness and the material of the layer is distributed on the support as evenly as possible by means of conventional devices such as rotating rollers, raking devices or other stripping devices. The thus dimensioned layer is then solidified. The layer may be formed of thermoplastic synthetic materials, and in this case, the layer is preferably solidified by sintering of the individual particles or fibers. On the other hand, if the layer is formed of materials which do not possess thermoplastic properties, then the layer is impregnated with a synthetic resin adhesive adapted to be hardened, and the synthetic resin adhesive is then hardened by polymerization or condensation or volatilization of solvents contained in the synthetic resin adhesive, so that in this manner a liquid-permeable self-supporting foil is formed which may then be cut to the dimensions of the storage battery separator and are then ready for installation in an electric storage battery.

It is an advantage of separators produced as described above, particularly when such separators are produced of natural materials such as wood fibers, that the particle size and chemical composition of the insulating material can be easily controlled and that by appropriate screening variations in the particle sizes of pulverulent insulating materials can be limited. Generally, and particularly with respect to separator plates which are produced by sintering pulverulent material, the particle sizes control the degree of porosity of the finished separator. The porosity of the separator should not be too small in view of the electric resistance of the separator, however, in view of other separator characteristics which are essential for the operation of the storage battery, the porosity should also not be too great. Since, however, the individual particles or grains are deformed during sintering, and even fibrous materials of equal fiber diameter will upon impregnation with hardenable resin form a felt or fleece of uneven pore distribution, it is extremely difficult to obtain a reasonably even pore size in the finished separator foil. Up to now it was the general belief that it has to suffice to control the irregularities of the pore sizes on the basis of practical experience during the production of the separator foils or plates and to attempt to even-out the pore sizes by appropriate variations in the compression of the particles.

It is possible in this manner to obtain separators of an electrical resistance or electric permeability within the desired ranges, and this electric resistance or permeability can be controlled from time to time by checking sample pieces taken from the continuously produced separator foil, and by appropriate changes in the solidification temperatures, the length of time of the passage of the layer through the tunnel furnace in which the same is solidified, and also by adjustment of the pressure at which the layer is compressed. However, it has been found that by obtaining in this manner a substantially even permeability of the separator for hydrogen ions, which is controlling for the electric resistance, will not similarly assure desirable separator characteristics with respect to other operating conditions of the storage battery which are influenced by the separator. Particularly, notwithstanding the desired hydrogen ion permeability of these prior art separators, generally the migration of antimony (required for improving the strength of the grid plates) to the negative electrode and self discharge of the battery caused thereby will show unsatisfactory high values.

It is therefore an object of the present invention to provide a separator and a method of making the same, which is not subject to the above discussed difficulties and disadvantages.

It is a further object of the present invention to produce a porous battery separator with substantially even pore size or diameter of the interstices within the separator.

It is yet a further object of the present invention to provide a method of producing a porous separator of substantially even pore size by which the larger pores of the initially formed layer of insulating material will be reduced in size substantially without affecting the dimensions of the smaller pores.

Other objects and advantages of the present invention will become apparent from a further reading of the description and of the appended claims.

With the above and other objects in view, the present invention includes a method of producing an insulating body, such as a porous separator for lead storage batteries and the like, and of substantially even porosity throughout, comprising the steps of forming a layer of discrete bodies of insulating material with interstices of differing dimensions therebetween; adhering said bodies to each other but slightly so as to form a coherent but compressible layer thereof; subjecting the thus-formed coherent, compressible layer to compression so as to compress said layer and to reduce and substantially equalize the dimensions of the interstices therein; and rigidifying the thus-formed compressed layer, so as to transform the same into a rigid, self-supporting, porous, substantially plate-shaped body consisting essentially of said insulating material and formed with open pores of substantially equal dimensions.

The present invention also contemplates a porous separator plate or the like consisting essentially of a self-supporting body of insulating material formed with interstices of substantially even diameters of less than 40 microns.

Thus, according to the present invention, the uniformity of the sizes of the interconnected pores or interstices is improved during the production of the porous foil. Thereby, particularly the larger pores are reduced in size while the dimensions of the smaller pores are left substantially unchanged. This is achieved according to the method of the present invention by uniting the layer of discrete insulating particles only so as to adhere the individual particles, the pulverulent particles or fibers, to each other without forming a rigid structure. Thereafter, the layer is compressed so as to be reduced in its cross sectional dimension preferably by between about 5 and 50%, usually between 10 and 50% and most preferably between 20 and 30%. Only after obtaining by thus compressing the coherent but still compressible layer the desired structure and porosity of the separator plate, the porous foil or plate will be rigidified so as to become self-supporting and no longer compressible.

This two-step adhering of the plate particles, namely a preliminary slight adhering followed by compression of the coherent layer and thereafter final adherence to form a rigid and no longer compressible plate will have the following effect:

The individual, discrete particles of fibers of insulating material will first be adhered to each other in a haphazard manner so as to form smaller and larger pores. Since, however, the adherence between the particles is relatively weak, the same are then compressed in the subsequent compression step so that essentially only the larger interstices or pores between the individual particles will be compressed and reduced in size, while in the case of the smaller pores or interstices, the adjacent faces of the pulverulent particles or of the adjacent fibers will offer a greater resistance against the applied pressure and thus there will be less deformation with respect to the smaller pores. In other words, the closer portions of the adjacent particles are located to each other or the smaller the pores or interstices therebetween, are the greater will be the resistance to compression. The result will be a reduction in the size of the larger pores or interstices, and thus an effective equalization of the statistical distribution of medium pore size without any substantial change in the diameters of the insulating particles. This is then followed by the last step of the present process, namely the final solidification or rigidification of the thus obtained insulating plate or foil formed with open pores or interstices of substantially equal diameter.

Thus, according to the present invention, the porosity of the separator plates can be controlled by slightly sintering or slightly adhesively adhering pulverulent particles, preferably of controlled size distribution, so as to adhere the particles to each other without forming a rigid structure, thereafter compressing the thus formed coherent but not rigid structure and finally completing sintering, or completing hardening of the adhesive, so as to give to the structure the desired degree of mechanical strength.

According to one embodiment of the present invention, fibrous material is either impregnated with a hardenable synthetic resin or subjected to slight sintering so as to again form a coherent but still compressible structure of the fibrous material, thereafter the thus-formed structure is compressed, and then hardening is completed by further sintering, or hardening the hardenable impregnating resin.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is an elevational view on an enlarged scale of a separator profile which may be obtained in accordance with the process of the present invention;

FIG. 2 is a greatly enlarged schematic, fragmentary cross sectional view through the structure of a conventional sinter separator formed of pulverulent, thermoplastic synthetic material;

FIG. 3 is a schematic fragmentary cross sectional view of the theoretically most desirable structure of such separator;

FIG. 4 is a greatly enlarged schematic cross sectional view of the structure of a sinter separator formed of pulverulent thermoplastic material, which will be obtained by following the process of the present invention;

FIG. 5 is a greatly enlarged, schematic elevational view of the structure of a separator formed of thermosetting resin-impregnated paper fibers or cellulose fibers, prior to compression of the same; and FIG. 6 is a schematic view of the structure shown in FIG. 5 after compression of the same in accordance with the present invention.

Referring now to the drawing, and particularly to FIG. 1, separator 1 is shown having a thickness of 0.6 mm. and the conventional shape of lead storage battery separators, namely on one side a smooth outer face 2, and on the other side an outer face 4 which is provided with supporting ribs 3 and enlarged marginal ribs 3' which ribs protect the separator against corrosion at the negative electrode. Ribs 3 and 3' are formed in a manner known per se by providing corresponding grooves in the moving belt which serves as support for the layer formed of thermoplastic synthetic particles of the particles sizes 5, 5' and 5" (as shown in FIG. 2) which are then conventionally adhered to each other so as to form a self-supporting liquid-permeable foil. Since the particle sizes as shown in FIG. 2, and as is usually the case, deviate considerably from an average or mean value, so that the ratio between the diameters of the largest grains 5, and the smallest grains 5" may equal about 10:1, there will also be formed pores of correspondingly different sizes, namely pores such as pores 6, 6' and 6" of FIG. 2. In contrast thereto, the theoretically ideal structure would be that shown in FIG. 3, wherein all grains 7 and 7' are of the same size and thus the interstices or pores 8 and 8' also would be of equal size or diameter. However, this is a practically hardly attainable structure, inasmuch as it is generally required to form the separator of particles belonging to different size ranges.

As shown in FIG. 4, a separator produced according to the present invention will have a structure containing pores 10, 10' and 10" all of which are substantially of identical size or diameter, notwithstanding the fact that the separator is formed of particles 9, 9' and 9" of thermoplastic material, which particles differ very considerably with respect to their size. The substantially equally sized pores of the separator according to FIG. 4 are produced according to the present invention by first sintering the particles 9, 9' and 9" only slightly so as to form a coherent but not a rigid layer, and by continuing sintering only after compression of the coherent pulverulent layer, preferably simultaneously with reduction in the pressure to which the layer is exposed. It is achieved in this manner, that the particles 9, 9' and 9", after cooling, are rigidly adhered to each other to form the final separator structure. It is an advantage of the interruption of sintering prior to compression of the structure, that the unavoidable temperature differences between the larger and smaller particles which occur due to the limited heat conductivity of the particles will change during cooling in a sense opposite to that in which the temperature differences will change during heating of the mass. The larger particles 9' will then desirably possess a higher temperature during compression than the smaller particles 9". In order to more evenly distribute heat, cooling air is passed through the entire layer and is turned off somewhat prior to the start of the compression step so that the walls of the still larger pores will be heated up to a somewhat higher temperature.

It is thus achieved, according to the presently discussed embodiment of the present invention, that the sintering process is interrupted prior to compression of the layer and that differently sized particles will cool differently— the larger ones slower and the smaller ones faster. Thereby the larger particles will remain softer and the smaller particles will become hard again, and when the particles are then compressed, due to the hardness of the small particles and the relative softness of the larger particles, substantially equally sized interstices or pores will be obtained between the individual particles, as shown in FIG. 4.

FIGS. 5 and 6 illustrate the present method in connection with the forming of the separator of fibers 11, 11' and 11" which are impregnated with hardenable synthetic resin. As shown in FIG. 5, prior to compression of the impregnated fibers, the interstices 12, 12' and 12" are of highly different sizes, while upon compression of the adhering fibers, prior to complete solidification of the thermosetting resin, as shown in FIG. 6, the interstices 13, 13' and 13", formed between the individual fibers are of much more even size. The smallest interstices, up to about the size of the interstices which are identified in FIG. 5 by reference numeral 12 and in FIG. 6 by reference numeral 13, remain substantially unchanged, while the elongated interstices 12' of FIG. 5 are changed into several smaller interstices 13' and the larger interstices 12' into several smaller interstices 13'.

In the schematic illustration of FIGS. 5 and 6, the still flowable synthetic resin layers have been omitted in FIG. 5, as well as the hardened synthetic resin which in FIG. 6 firmly grips contacting portions of the respective fibers.

The separator according to FIGS. 5 and 6 may be formed, for instance, by impregnating a web of paper-forming fibers with a phenolic resin or other acid-resistant resin, predrying at a temperature of between 80° C. and 100° C., thereafter rolling the web so as to reduce its cross sectional dimension by between about 20 and 50% and thereby also reducing the size of the larger pores, and finally thermosetting the resin at about 150° C.

Similarly, separator layers formed of synthetic materials may be compressed by pressing or rolling so as to reduce the cross section thereof by between 5 and 30%.

Preferably, the thickness of the paper or cellulose fibers will be between 1 and 10 microns and, correspondingly, the thickness of the covering resin layer will be between 0.5 and 3 microns.

Irrespective of whether the separator according to the present invention is formed of pulverulent material or of haphazardly arranged fibers, it has been found advantageous to compress the loosely adhered coherent layer so that the average pore diameter of the major portion of the pores is below an upper limit of 40 microns, at which size the electric resistance of the separator against electrolytic current conductivity is already very low, hardly as much as 10 M ohm cm./cm.², while the migration of antimony is still rather insignificant at the above mentioned pore sizes. Surprisingly, the antimony permeability which controls the self discharge of the battery rises quickly, for reasons which are not fully understood, only at a pore size above 40 microns. This might also be an explanatoin for the fact that separators produced according to the present invention so as to substantially contain only pores and interstices having diameters of less than 40 microns will permit considerable less self-discharge of the battery while having an electric resistance comparable to that of separators produced according to the methods of the prior art.

The present invention does provide that discrete insulating bodies which may be pulverulent particles or fibrous bodies are adhered to each other, either by sintering or adhesively, for instance by means of a thermosetting resin, whereby the adherence is interrupted at a point when the thus formed structure is still compressible, the thus formed coherent layer is compressed and thereafter firm adherence or rigidification of the compressed structure is achieved by further sintering, or hardening of the adhesive.

When forming the separator of pulverulent particles by sintering, then the above-described interruption of the sintering process, will cause firm adherence of the smaller particles to each other so that upon the subsequent compression the larger grains or particles will be subjected to more severe deformation causing the formation of more evenly sized pores or interstices than could be obtained if pressing and sintering were carried out simultaneously. Thereby, the cooling which is started during the sintering prior to compressing will improve the relative deformability of the larger and still hotter grains or particles 5, so that the structure according to FIG. 2 will eventually be converted into a structure according to FIG. 4.

When it is desired to form by interrupted sintering with intermediate compression a separator of fibers of synthetic, preferably thermoplastic material which corresponding to the showing in FIGS. 5 and 6 is compressed prior to completion of sintering, then it will be found that the presintered contacting fiber portions will yield more easily if the distance of the respective contacting fiber portion from its next point of contact with another fiber is relatively long. Here again, the deformation by compression will thus cause an evening out of the dimensions of the pores because the longer the individual fiber section between points of contact of the same with other fibers, the more easily such fiber section can be bent and thus brought in contact with adjacent fibers. This is shown in FIG. 6. However, it is again important that the sintering process is interrupted and compression starts before the contacting fiber portions are firmly adhered to each other. If compression starts too early, then all fibers will easily slide along each other and smaller as well as larger interstices will be formed. If compression starts too late, after the points of contact between the fibers have substantially hardened, then no more dislocation between adjacent fibers is possible and the fibers will rather tend to break. It is therefore important that irrespective of whether pulverulent or fibrous material is to be adhered by sintering, that the sintering process is interrupted when a coherent but still compressible and not rigidified structure has been obtained and that only after subsequent compression, the sintering process is completed so as to obtain the final and rigid structure.

When it is desired to adhere fibrous insulating material, for instance, cellulose fibers to each other by utilizing a synthetic adhesive in liquid form, for instance a thermosetting resin or a resin dissolved in a suitable solvent known in the art, then the same effect is achieved by allowing the resin adhesive to harden only to such an extent that the contacting fibers adhere to each other with about the same strength with which they adhere to each other upon interruption of the sintering process described above. Upon subsequent compression of the fibrous structure it will then again be achieved that the pores or interstices in the structure will be of substantially even size as shown in FIG. 6, and thereafter the adhesive is then completely hardened by evaporation of the solvent or by allowing the thermosetting resin to harden completely so as to obtain the rigid separator structure according to FIG. 6.

It is quite obvious that if the adhesive would already be completely hardened while the structure is in the condition illustrated in FIG. 5, then the application of pressure would not result in sliding movement of the slightly adhering fibers to form the structure of FIG. 6, but rather in breaking of the fiber portions which extend for considerable length between points of contact with other fibers.

It is also possible to form the structure of FIG. 4 by adhering to each other pulverulent particles which do not consist of a thermoplastic synthetic resin but which are wetted or coated with a hardenable adhesive. Here again substantially the same conditions prevail as in the forming of the structure of FIG. 4 by interrupted sintering with intermediate compression of thermoplastic particles. Compression is to be applied when the adhesive is no longer highly fluid but before the adhesive has hardened. If the adhesive is too fluid, then, upon compression of the pulverulent mass, the interstices or pore sizes will not even out. On the other hand, if the adhesive is already partially hardened, then the smaller grains will offer greater resistance against deformation by the applied pressure than the larger grains and thus the structure as illustrated in FIG. 4 will be obtained.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing a porous, substantially plate-shaped body of substantially uniform porosity throughout, comprising the steps of forming a layer of a mixture of smaller and larger discrete granular particles of thermoplastic material having different diameters within the range of between about 20 and 200 microns; sintering said layer of smaller and larger discrete granular particles of thermoplastic material in heated condition while said thermoplastic granular particles are softened so as to adhere said particles to each other without substantial deformation thereof and to form thereby a coherent layer of said heated thermoplastic granular particles having interstices of different size therebetween; permitting the thus formed coherent layer of said heated thermoplastic granular particles to cool until said smaller thermoplastic granular particles have hardened while said larger thermoplastic granular particles remain still softened; subjecting the thus formed partly hardened sintered layer to compression, so as to compress said layer by compressing therein said still softened larger thermoplastic granular particles and to thereby substantially equalize the size of the interstices between all granular particles of said layer; and hardening the thus formed layer of thermoplastic granular particles so as to form a rigid, substantially plate-shaped body of substantially uniform porosity.

2. A method as defined in claim 1, wherein the compressing of said compressible layer is carried out so as to reduce the cross section thereof by between about 5 and 50%.

3. A method as defined in claim 2, wherein the compressing of said compressible layer is carried out so as to reduce the cross section thereof by between about 20 and 30%.

4. A method as defined in claim 1, wherein said compressing of said compressible layer is carried out so as to form ribs thereon.

5. A method as defined in claim 1, wherein said compressing of said compressible layer is carried out in such manner as to reduce the diameters of at least the major portion of the interstices therein to below 40 microns.

6. A method according to claim 1 wherein rigidification of said layer is started during compression of the same.

References Cited
UNITED STATES PATENTS

| | | | |
|---|---|---|---|
| 2,297,248 | 9/1942 | Rudolph | 136—146 X |
| 2,428,771 | 10/1947 | Almy | 264—120 |
| 3,045,058 | 7/1962 | Martinak | 136—148 X |
| 3,084,091 | 4/1963 | Volkman et al. | 136—148 X |
| 3,121,658 | 2/1964 | Orsino et al. | 136—148 X |
| 3,188,243 | 6/1965 | Booth et al. | 136—148 |

WINSTON A. DOUGLAS, *Primary Examiner.*

D. L. WALTON, *Assistant Examiner.*